US011942299B2

(12) United States Patent
Gonçalves De Villa et al.

(10) Patent No.: US 11,942,299 B2
(45) Date of Patent: Mar. 26, 2024

(54) SWITCH MODULE IN A MOLDED CASING FOR A CIRCUIT BREAKER AND CIRCUIT BREAKER IN A MODULAR MOLDED CASING

(71) Applicant: WEG Drives and Controls Automação LTDA, Jaragua do Sul (BR)

(72) Inventors: Rodrigo Gonçalves De Villa, Jaragua do Sul (BR); Everton Soares Pivotto, Jaragua do Sul (BR); Fábio Decker De Souza, Jaragua do Sul (BR)

(73) Assignee: WEG DRIVES AND CONTROLS AUTOMAÇÃO LTDA, Jaraguá Do Sul (BR)

( * ) Notice: Subject to any disclaimer, the term of this patent is extended or adjusted under 35 U.S.C. 154(b) by 206 days.

(21) Appl. No.: 17/416,506

(22) PCT Filed: Dec. 21, 2018

(86) PCT No.: PCT/BR2018/050477
§ 371 (c)(1),
(2) Date: Jun. 20, 2021

(87) PCT Pub. No.: WO2020/124175
PCT Pub. Date: Jun. 25, 2020

(65) Prior Publication Data

US 2022/0076911 A1 Mar. 10, 2022

(51) Int. Cl.

| | |
|---|---|
| ***H01H 33/60*** | (2006.01) |
| ***H01H 71/02*** | (2006.01) |
| ***H01H 71/10*** | (2006.01) |

(52) U.S. Cl.
CPC ............ *H01H 71/10* (2013.01); *H01H 33/60* (2013.01); *H01H 71/02* (2013.01)

(58) Field of Classification Search
CPC ........ H01H 1/2058; H01H 1/20; H01H 9/443; H01H 9/0264; H01H 9/104; H01H 9/542;
(Continued)

(56) References Cited

U.S. PATENT DOCUMENTS 4,037,183 A 7/1977 Gaskill
4,064,469 A 12/1977 Gryctko
(Continued)

FOREIGN PATENT DOCUMENTS

BR 102014011570 A2 6/2015
BR 102014020891 A2 2/2016
(Continued)

OTHER PUBLICATIONS

International Search Report and Written Opinion for International Application No. PCT/BR2018/050477 dated May 14, 2019, 16 pages.

*Primary Examiner* — Bryan R Perez
(74) *Attorney, Agent, or Firm* — Troutman Pepper Hamilton Sanders LLP; Ryan A. Schneider; Dustin B. Weeks

(57) ABSTRACT

A unipolar switching module made of insulating material and including an incorporated thermomagnetic tripping set, and/or a current measurer and power supply set for an electronic controller A multipolar low-voltage molded case circuit breaker can include unipolar switching modules, which interact with the tripping set and/or the current measurer and power supply set.

18 Claims, 7 Drawing Sheets

(58) Field of Classification Search
CPC .. H01H 71/10; H01H 71/0228; H01H 71/121; H01H 71/1045; H01H 71/40; H01H 71/08; H01H 71/082; H01H 71/002; H01H 71/0207; H01H 71/123
See application file for complete search history.

(56) References Cited

U.S. PATENT DOCUMENTS

| | | | | |
|---|---|---|---|---|
| 6,222,433 | B1 | 4/2001 | Ramakrishnan | |
| 10,410,810 | B2 * | 9/2019 | Rota Martir | H01H 73/045 |
| 2005/0195055 | A1 * | 9/2005 | McCoy | H01H 71/2463<br>335/35 |
| 2014/0339197 | A1 * | 11/2014 | Moreau | H01H 33/08<br>218/151 |
| 2018/0323027 | A1 * | 11/2018 | Tomaselli | H01H 71/123 |

FOREIGN PATENT DOCUMENTS

| | | | |
|---|---|---|---|
| BR | 112012005824 | A2 | 3/2016 |
| EP | 0177438 | A2 | 4/1986 |
| EP | 0538149 | A1 | 4/1993 |
| EP | 0542636 | A1 | 5/1993 |
| EP | 0591073 | A1 | 4/1994 |
| EP | 0961306 | A2 | 12/1999 |
| FR | 2757675 | B1 | 1/1999 |
| WO | 2013191924 | A1 | 12/2013 |

* cited by examiner

CROSS-SECTIONALLY ON THE "XY" PLANE

SWITCH MODULE IN A MOLDED CASING FOR A CIRCUIT BREAKER AND CIRCUIT BREAKER IN A MODULAR MOLDED CASING

FIELD OF THE INVENTION

The present invention is related to the technological field of electrical protection switches, and particularly a unipolar switching module or a multipolar low-voltage circuit breaker using said unipolar switching module, operated by an operating handle, said unipolar switching module comprising bipartite insulating case, included in a main case, or individually, each said unipolar switching module of said circuit breaker comprising a rotary contact system, an arc extinguishing system and preferably a thermomagnetic tripping set or an electronic tripping set, able to establish and break the current conduction in a distribution line.

BACKGROUND OF THE INVENTION

As known in the state of the art, the working of molded case circuit breakers may have their operation based on thermal, magnetic, thermomagnetic or even electronic principles, through the movement of electrical contacts, which can be used, mostly, to protect electrical circuits subjects to short-circuiting and/or electrical overloads generated by levels of electrical current that exceed a previously established nominal limit, by linking input and output terminals, connected to the power electric line to be protected.

Therefore, as already known in the state art that circuit breakers fundamentally works in analogous way to electrical switch devices, that is, they work in such a way as to change the state of electrical conduction of an electrical circuit between the "ON" and "OFF" states of operation. In addition to acting automatically, conventional circuit breakers also comprise an operating handle operable by a user. In this type of construction in molded case it is typical that the current load capacity support relatively high values around 1600 A and even more.

It is common to note in the state of the art that most of these molded case circuit breaker models and constructions are provided with an incorporated thermomagnetic tripping unit for automatic operations under predetermined failure conditions.

In many that cases, present in the state of the art, the tripping unit was built in a removable and replaceable manner.

In other cases, the switching modules have been constructed in a removable and replaceable way, interchangeable between a module comprising a state/electronic tripping assembly and another module comprising an electromagnetic tripping set, comprising internally to the circuit breaker all the triggers required by the poles of the device.

Although such replaceable tripping assemblies have advantages due to their own characteristic of operating flexibility, these assemblies require complicated docking elements to ensure coupling between the modules and the molded base of a molded case circuit breaker, and the tripping modules constructed in tripolar arrangement, which ultimately increases the initial acquisition cost.

Another type of construction of molded case circuit breaker was taught the individual construction of switching modules, mounted side by side with the purpose of obtaining individual insulation of switching systems per pole.

Similarly, the construction of bipartite cases of individual switching modules is known in the art, where the modules are mounted side by side with the purpose of obtaining individual isolation of switching systems per pole, including double isolation through a case involving the individual switching modules.

These constructions are widely known by the persons skilled in the art, however all these solutions contained a gap as to inclusion in these bipartite individual switching modules of an incorporated thermomagnetic tripping assembly or an electronic tripping set, since advantages in arrangements can be provided with in order to gain flexibility in the application or otherwise in the original manufacture, as is the case, bringing advantages in economic terms, of time, inventory management and use of standardized components, bringing benefits in simplicity, avoiding complicated assemblies, which necessarily would imply the administration of more components and their controls, increasing the final cost of the product.

DESCRIPTION OF THE STATE OF THE ART

One of the solutions of the state of the art, the U.S. Pat. No. 4,037,183 dated of 1976, presents a multipole molded case circuit breaker, provided with a removable and replaceable solid state tripping unit, built with all the elements of current failure detection with a common case. For each of the poles of the circuit breaker, the unit includes an input and a power circuit of a current transformer, mounted on a board, arranged in the inside the case. The output circuit is connected to operate a permanent magnet trigger mechanism, for actuate a mechanical lock, which normally keeps the contacts operating mechanism in an initial position. The invention also taught an arrangement of two transformers, used inside the removable module, positioned at a right angle, seeking a favorable compaction for its construction, of the dimensions of the replaceable block. U.S. Pat. No. 4,037,183 and also U.S. Pat. No. 4,064,469 in 1977, present between them an exchangeability in the use of both thermomagnetic and electronic state modules.

Another solution is presented in patent EP0177438, initially filed in 1984, wherein a multipolar molded case circuit breaker has 3 unipolar sets mounted side by side, wherein a handle set contained in a central first pole, together with a movable contact set having a traverse bar, which couples to another two lateral modules connected to the first arm of the contacts set, wherein the arms guarantee motion sync of each movable contact set during normal operations. Each pole contains a mechanism capable of tripping said circuit breaker.

Another solution is presented in document EP0542636 and EP0538149 in 1991, which presents a multipolar low-voltage circuit breaker device having a double case, each pole including a unipolar switching unit having a parallelepiped plastic box having extended two side faces. Contacts are additionally provided and associated to an extinguishing chamber housed with the unipolar switching unit. Several units are mounted side by side in the parallelepiped box to form a multipolar circuit breaker. Another patent containing an interchangeable tripping unit used in a molded case circuit breaker is taught in patent EP0591073 in 1992 in a similar way.

U.S. Pat. No. 6,222,433 presents a molded case circuit breaker comprising unipolar circuit breaker modules called cassettes, where the handle and the operating mechanism are mounted on the central cassette, and a single thermomagnetic tripping set mounted on the terminals of the unipolar cassettes that are inserted inside a second case.

These documents presented and others from the state of the art have sought by the construction of unipolar tripping modules to increase breaking capacity and also simplify the assembly process in manufacturing or the flexibility of the product application, that currently has several options for building such devices. Various solutions were built, from the first interchangeable model between tripping electromagnetic/electronic modules to the modules of double case, at times seeking the efficiency of the manufacturing process, at others enhancing operating conditions and useful life.

OBJECTIVES OF THE INVENTION

The first objective of the present invention is to provide unipolar switching modules constructed to facilitate the assembly of components of a low-voltage molded case circuit breaker.

The second objective of the invention is to use a same case for several unipolar switching modules and a same external case to encase said thermomagnetic unipolar switching modules.

The third objective of the invention is to use a same case for several unipolar switching modules and a same external case to encase said electronic unipolar switching modules.

The fourth objective of the invention is to use a same external case both for electronic tripping and thermomagnetic cassettes, in different nominal current ranges.

The fifth objective of the invention is to provide a switching device with a lesser number of components than the state of the art.

The sixth objective of the invention is to provide a switching device satisfying the above requirements, being compact in its longitudinal measure and simplified, maintaining the structural rigidity.

DETAILED DESCRIPTION OF THE DRAWINGS

Figure 1:
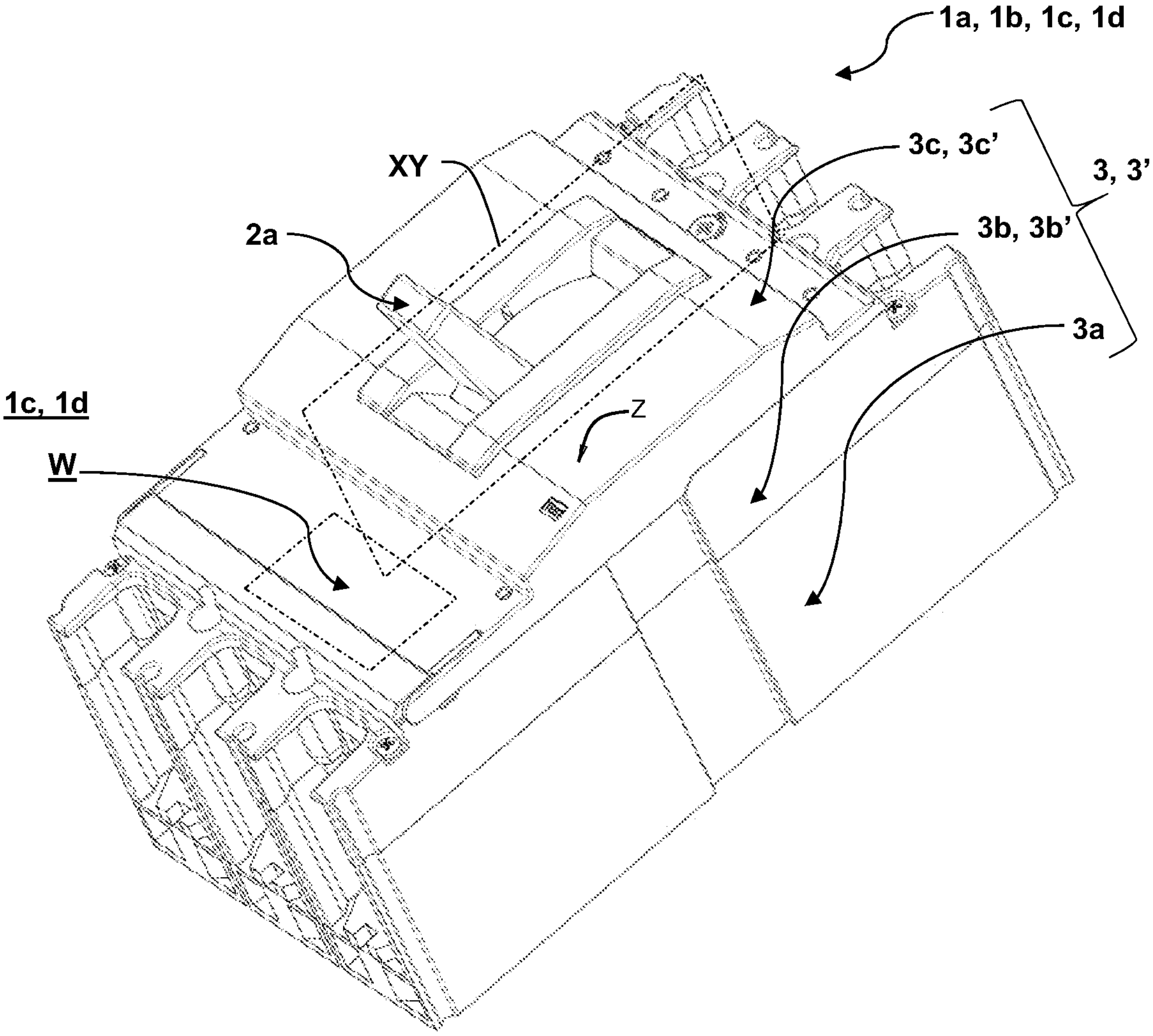
FIG. 1 illustrates, in isometric perspective view, a low-voltage molded case circuit breaker and its operating handle, object of the present invention.

FIG. 1 illustrates, in an isometric perspective view, a low-voltage molded case circuit breaker (1*a*, 1*b*, 1*c*, 1*d*), object of the present invention, of the type that comprises at least one operating handle (2*a*), positioned preferably centrally relative to the front operating face of said molded case circuit breaker (1*a*, 1*b*, 1*c*, 1*d*), aligned to an "XY" plane, said operating handle (2*a*) of the molded case circuit breaker (1*a*, 1*b*, 1*c*, 1*d*) being subject to a translation movement relative to the front operating face and on the "XY" plane and in rotary trajectory internally, in a schematic "Z" rotary shaft so as to change the state of electric conduction of an electrical circuit between the "ON" and "OFF" states, or present another state, such as "TRIP" for example, comprising an external case (3, 3') comprising a base case (3*a*), an intermediate case (3*b*, 3*b*') and a cover (3*c*, 3*c*'), where said molded case circuit breaker (1*c*, 1*d*) presents an electronic controller (W) housed inside said external case (3).

Figure 2:
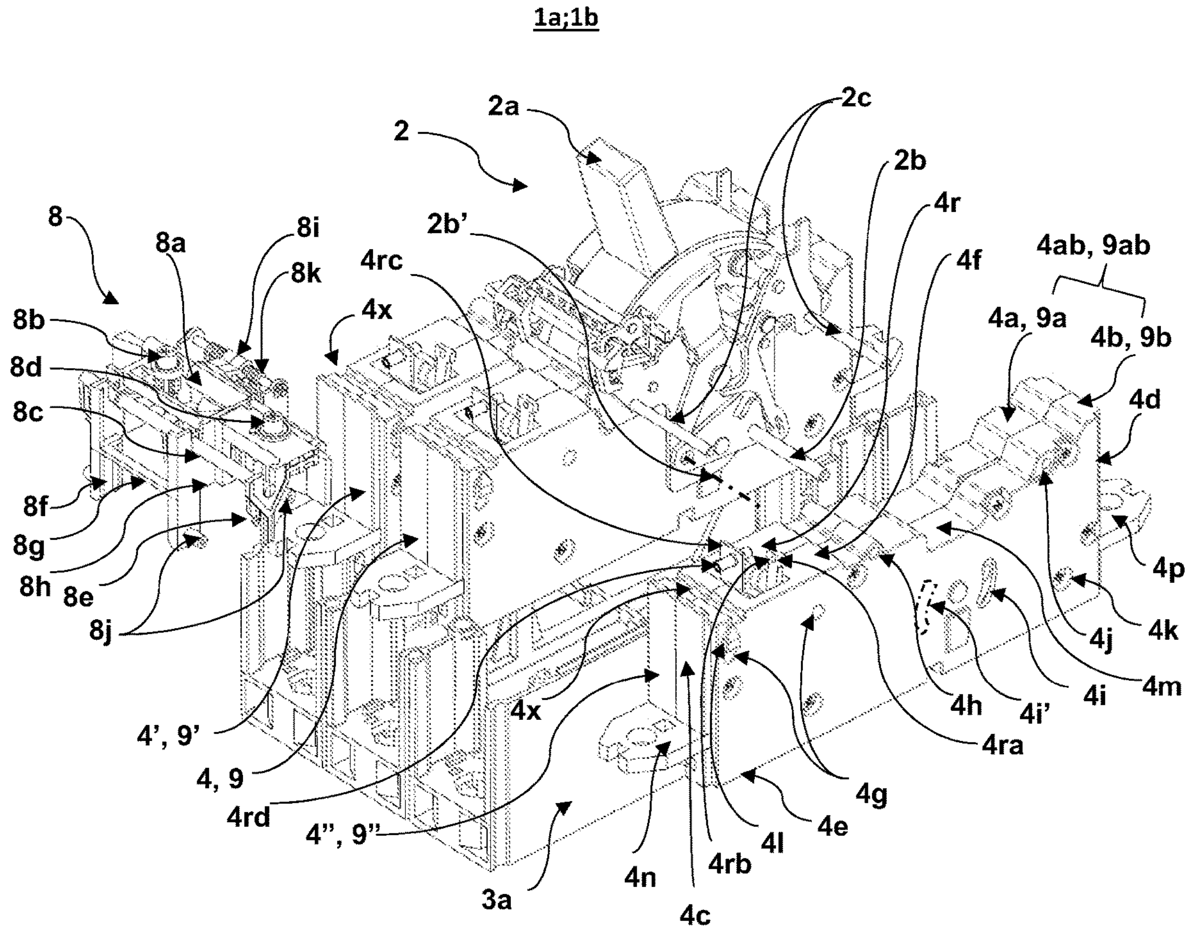
FIG. 2 illustrates, in an exploded schematic isometric perspective view, parts of the molded case circuit breaker of FIG. 1, according to a first and second preferred embodiment of the present invention.
Figure 3:
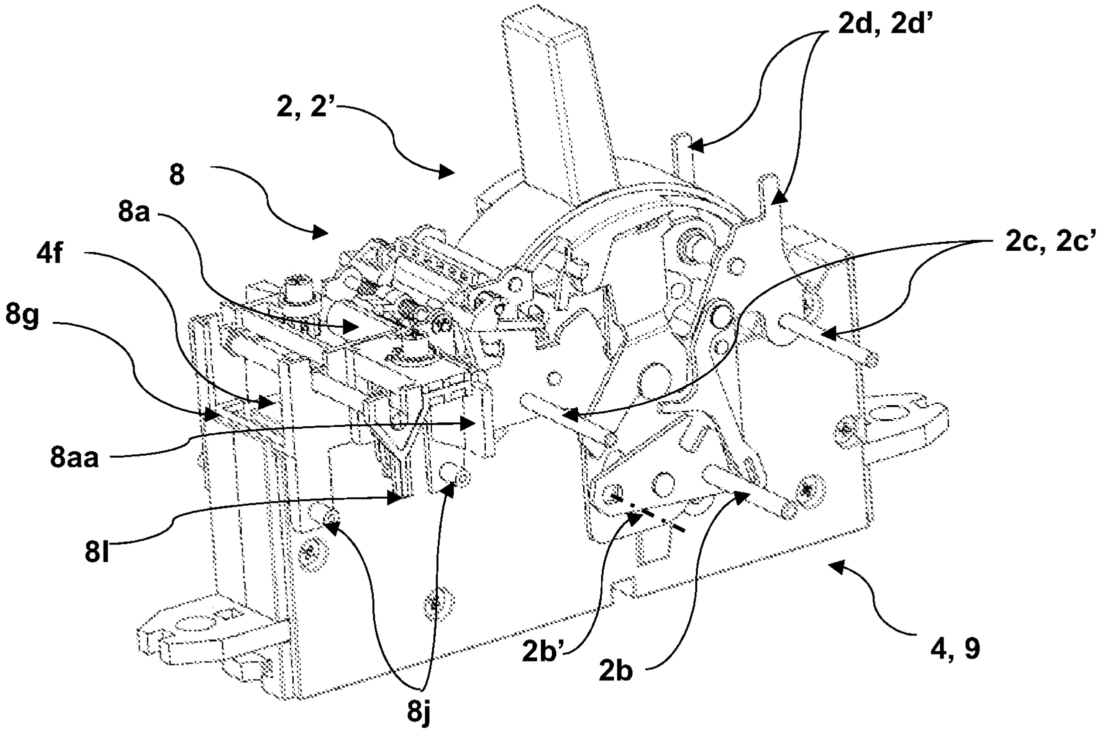
FIG. 3 illustrates, in a top perspective view, a unipolar switching module for circuit breakers, according to a first preferred embodiment of the present invention.
Figure 4:
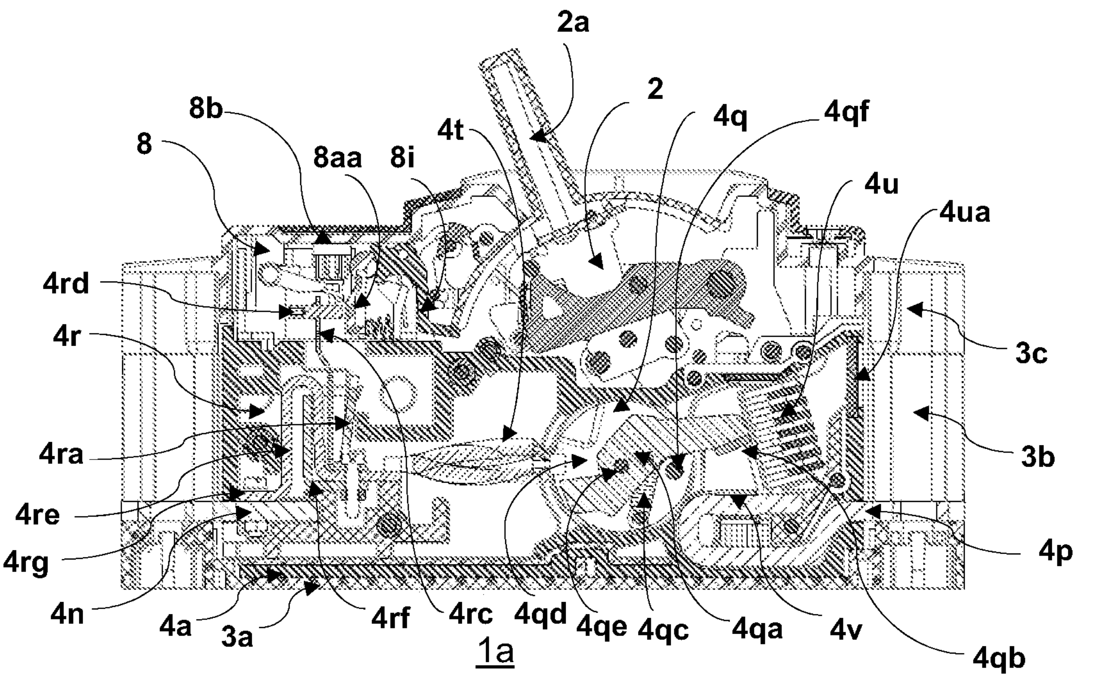
FIG. 4 illustrates, the internal parts in a cross section view, including a unipolar switching module of the thermomagnetic tripping molded case circuit breaker of FIG. 1, according to a first preferred embodiment of the present invention.

FIG. 2 illustrates, in an exploded schematic isometric perspective view, parts of said molded case circuit breaker (1*a*, 1*b*) of FIG. 1, according to a first and second preferred embodiments of the present invention, comprising an operating and tripping mechanism (2) comprising an operating handle (2*a*) of said molded case circuit breaker (1*a*, 1*b*), standard in the state of the art, said operating and tripping mechanism (2) comprising for said first preferred embodiment of the present invention of said thermomagnetic circuit breaker (1*a*) an equalization shaft (2*b*) of the rotary contact system (4*q*) best observed in FIG. 4, and two positioning shafts (2*c*), fixed on a central unipolar switching module (4), jointly with a other two side unipolar switching modules (4', 4") preferably identical to said central unipolar switching module (4), comprising a case (4*ab*), besides a tripping set (8) and a base case (3*a*). Said unipolar switching modules (4, 4', 4") constructed in parallelepiped format comprising a case (4*ab*) comprising a first cavity (4*a*) and a second cavity (4*b*), made of insulating material preferably inversely identical made of insulating material, forming a case (4*ab*), comprising an anterior side face (4*c*), posterior side face (4*d*), bottom face (4*e*), top face (4*f*) comprising a recess (4*m*) and a recess (4*x*), side positioning holes (4*h*, 4*g*, 4*h*, 4*j*), curved hole (4*i*), vertical positioning rails (41) and fastening elements (4*k*) between said first insulating cavity (4*a*) and said second insulating cavity (4*b*). Internal components can also be seen which stand out through the first and second insulating cavities (4*a*, 4*b*), like the first electrical connection terminal (4*n*), a thermomagnetic tripping set (4*r*), comprising magnetic trip lever (4*ra*), a support hole (4*rb*) for a return spring (not represented), a bimetallic strip (4*rc*) comprising an adjustment element (4*rd*) and a second electric connection terminal (4*p*). This FIG. 2 additionally presents said tripping set (8), comprising a thermomagnetic tripping bar (8*a*), a thermal adjustment button (8*d*), an adjustment bar of the magnetic trip (8*c*) comprising a magnetic adjustment button (8*b*) and an engagement hook (8*e*) for a return spring (not represented) of the said magnetic trip lever (4*ra*), guide rails (8*f*), a traverse seat (8*g*), a seat base (8*h*) and a return spring (8*k*) of the trip trigger (8*i*) to trigger the trip of the operating and tripping mechanism (2) best seen in FIG. 4, and side locking shafts (8*j*) for the unipolar circuit switching modules (4', 4"). Practically identically to the way in which the first preferred embodiment was presented, the second preferred embodiment of the present invention presents said thermomagnetic circuit breaker (1*b*), comprising an operating mechanism (2') comprising an operating handle (2*a*') and additionally including a curved hole (4*i*') and a second equalization shaft (2*b*') represented by a centerline also in FIG. 3, of the double rotary contact system (9*d*) best observed in FIG. 7, and two positioning shafts (2*c*'), fixed on a central unipolar switching module (9), jointly with a other two side unipolar switching modules (9', 9") preferably identical to said central unipolar switching module (9), besides a tripping set (8) and a base case (3*a*).

Figure 7:
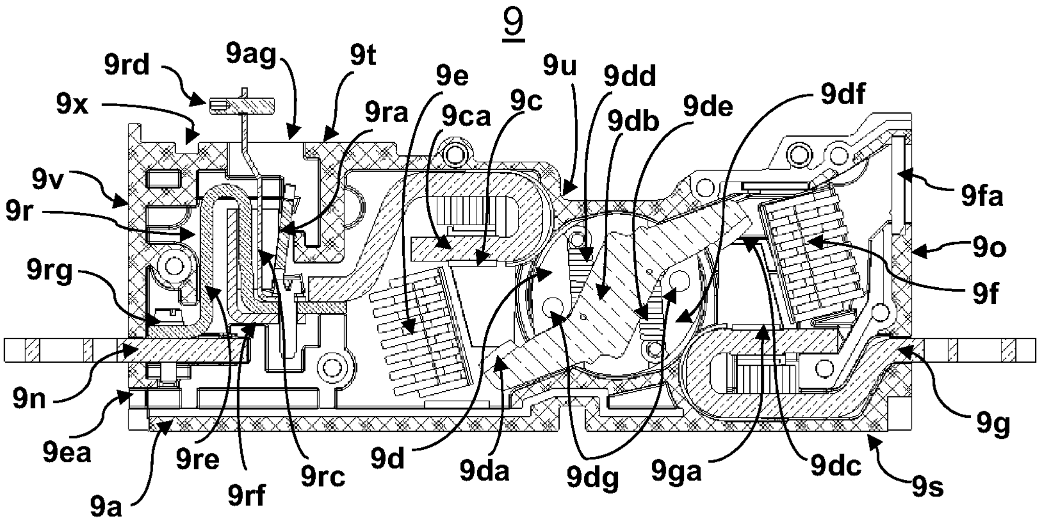
FIG. 7 illustrates, in a center cut view, the internal parts of the unipolar switching module with a system of double rotary contact of the thermomagnetic tripping molded case circuit breaker of FIG. 1, according to a second preferred embodiment of the present invention.

Said unipolar switching modules (9, 9', 9") constructed in parallelepiped format comprising a first cavity (9*a*) and a second cavity (9*b*), made of insulating material preferably inversely identical made of insulating material, forming a case (9*ab*), better viewed with a details in the FIG. 7.

FIG. 3 illustrates, in an isometric right side perspective view, said operating mechanism (2, 2') and said tripping set (8) fixed to said central unipolar switching module (4, 9) of said molded case circuit breaker (1*a*, 1*b*) viewed in the FIG. 1, according to a first and second preferred embodiment of the present invention, said operating mechanism (2, 2') comprising an equalization shaft (2*b*) of the simple rotary contact system (4*q*) seen in FIG. 4, and additionally, it is represented a second equalization shaft (2*b*') represented by a centerline of said double rotary contact system (9*d*) seen in FIG. 7, locking shafts (2*c*, 2*c*') and parallel flanges (2*d*, 2*d*'), said tripping set (8), in greater details, comprises locking shafts (8*j*), vertical positioning rod (81), said thermomagnetic tripping bar (8*a*) comprising a contact face (8*aa*) and a traverse seat (8*g*) positioned and supported on the top face (4*f*) of the central unipolar switching module (4, 9).

FIG. 4 illustrates, cross-sectionally on the "XY" plane, said molded case circuit breaker (1*a*) according to a first preferred embodiment of the present invention, including insulating base case (3*a*), insulating intermediate case (3*b*) and insulating cover (3*c*) in parallelepiped format, comprising a first cavity (4*a*) of said a case (4*ab*), including a first electric connection terminal (4*n*) electrically connected to a thermomagnetic tripping set (4*r*) through a fastening element (4*rg*), comprising a shunt bar (4*re*), a magnetic yoke (4*rf*) fixed to said shunt bar (4*re*), said bimetallic strip (4*rc*) including said adjustment element (4*rd*), a magnetic trip lever (4*ra*), a strand (4*t*), a simple rotary contact system (4*q*), comprising, a rotary traverse bar (4*qa*) comprising a movable contact (4*qb*) and spring (4*qc*) included in a pivoting support chamber (4*qd*) including a pivot shaft (4*qe*) and a through hole (4*qf*) to said equalization shaft (2*b*) of said rotary contact system (4*q*), said equalization shaft (2*b*) best seen in FIGS. 2 and 3, wherein the said rotary contact system (4*q*) being associated to an arc extinguishing system (4*u*), a grid (4*ua*) and to a fixed contact (4*v*) electrically connected to a second electric connection terminal (4*p*), said tripping set (8), comprising said face (8*aa*) of said thermomagnetic tripping bar (8*a*), a magnetic adjustment button (8*b*) and a trip trigger (8*i*), for trigger off the trip of the operating and tripping mechanism (2), among other components, where said operating handle (2*a*) of the molded case circuit breaker (1*a*) is seen in the "OFF" position.

Figure 5:
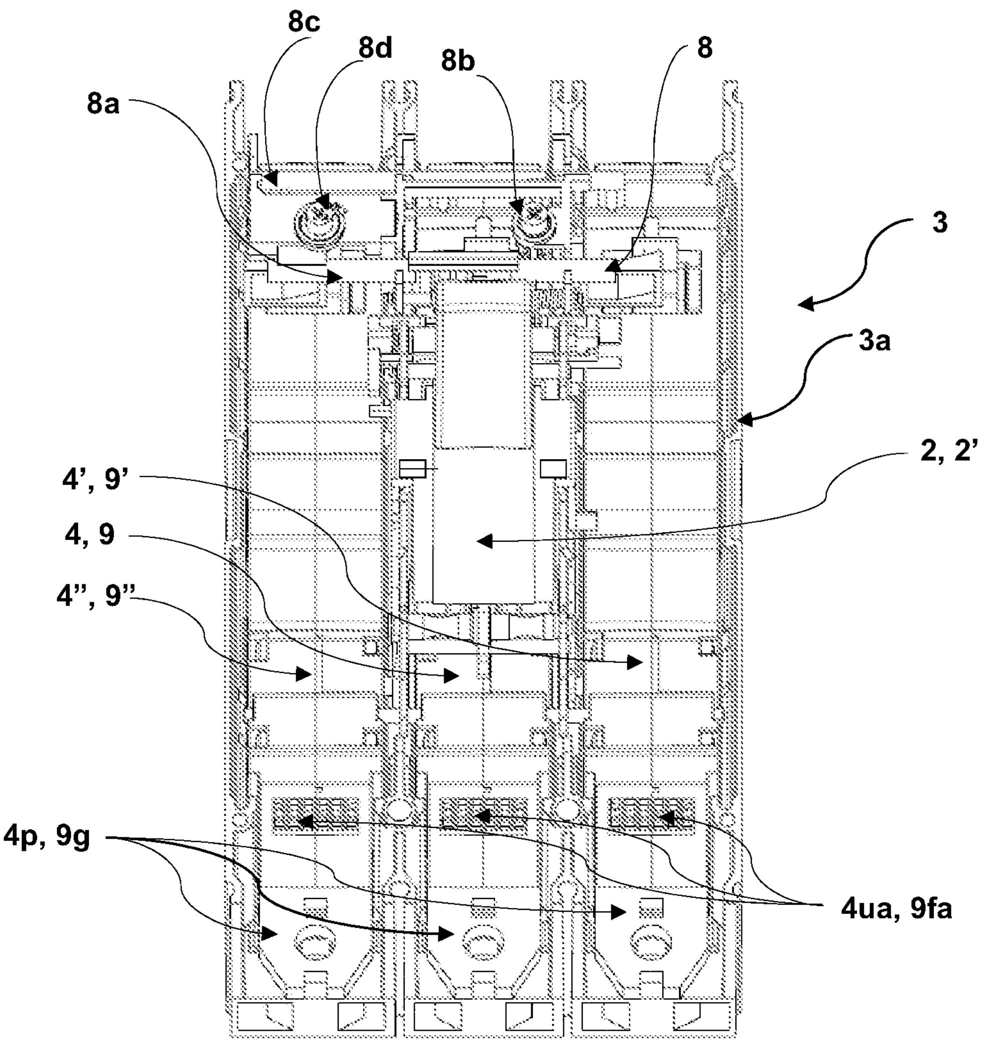
FIG. 5 illustrates, in an angled top view, internal parts of the molded case circuit breaker of FIG. 1, according to a first preferred embodiment of the present invention.

FIG. 5 illustrates, in a slanted top view parts of the molded case circuit breaker (1*a*, 1*b*) of FIG. 1, in a first and second preferred embodiments of the present invention, in "OFF" position, where said operating and tripping mechanism (2, 2'), tripping set (8) are presented, comprising a thermomagnetic tripping bar (8*a*), a thermal adjustment button (8*d*), a magnetic trip adjustment bar (8*c*), comprising a magnetic adjustment button (8*b*), a central unipolar switching module (4, 9), accompanied by the unipolar side switching modules (4', 4", 9', 9"), a base case (3*a*), grids (4*ua*, 9*fa*) and the second electrical connection terminals (4*p*, 9*g*), according to a first and second preferred embodiments of the present invention.

Figure 6:
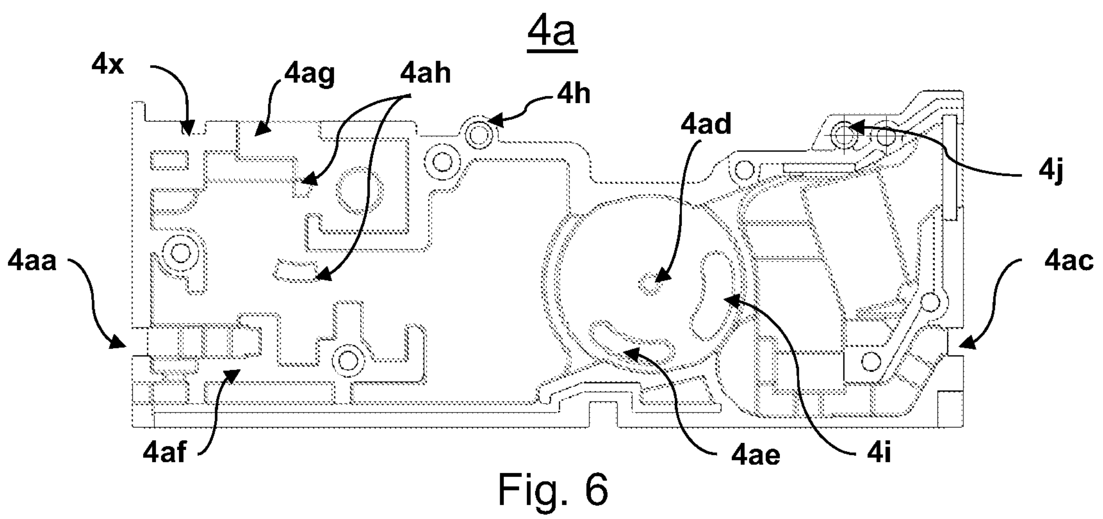
FIG. 6 illustrates, in a side view, the cavity of a unipolar switching module used in the molded case circuit breaker of FIG. 1, according to a first preferred embodiment of the present invention.

FIG. 6 illustrates, in front side view the first cavity (4*a*) of said case (4*ab*) of the unipolar switching module (4, 4', 4"), comprising an entry hole (4*aa*) for said first electric connection terminal (4*n*) seen in FIGS. 2 and 4, guide channels (4*ah*) for said magnetic trip lever (4*ra*) seen in FIG. 2, a non-through hole (4*ad*) for supporting said pivot shaft (4*qe*) seen in FIG. 4 and a curved guide (4*ae*) bearing and limiting the movement of said pivoting support chamber (4*qd*) of said rotary contact system (4*q*), seen in FIG. 4, structural reinforcements (4*af*), an exit hole (4*ag*) through to the passage of said magnetic trip lever (4*ra*) and of said bimetallic strip (4*rc*) of said thermomagnetic tripping set (4*r*) and an exit hole (4*ac*) for a second electric connection terminal (4*p*) seen in FIGS. 2 and 4, side positioning holes (4*h*, 4*j*) and a curved hole (4*i*), respectively, for the locking shafts (2*c*) of the mechanism and equalization shaft (2*b*) of the rotary contact system (4*q*) seen in FIGS. 2 and 4, according to a first preferred embodiment of the present invention. A second cavity (4*b*) inversely identical is provided as seen in FIG. 2, including on the other side to the equivalent inverted recess cavity (not represented) identical to said first cavity (4*a*) on the inner face of the second cavity (4*b*).

FIG. 7 illustrates, in a cross-section view, a unipolar switching module (9), of said multipolar molded case circuit breaker (1*b*) according to a second preferred embodiment of the present invention, in particular the representation of said central unipolar switching module (9), where the said modules (9, 9', 9") preferably being identical and sidewardly coupleable to each other, comprising a first cavity (9*a*) and a second cavity inversely identical (9*b*) seen in FIG. 2, a first electric connection terminal (9*n*) comprising a termination extension (9*ca*) comprising a first fixed contact (9*c*), a double rotary contact system (9*d*), comprising a first movable contact (9*da*), a rotary traverse bar (9*db*), a second movable contact (9*dc*), springs (9*dd*, 9*de*), a pivoting support chamber (9*df*), through holes (9*dg*) to said equalization shafts (2*b*) and said second equalization shaft (2*b*') of said double rotary contact system (9*d*) associated to arc extinguishing systems (9*e*, 9*f*), grids (9*ea*, 9*fa*), a second fixed contact (9*ga*) of a second electric connection terminal (9*g*), said first electric connection terminal (9*n*) is electrically coupled through of a fastening element (9*rg*) to said thermomagnetic tripping set (9*r*), comprising a shunt bar (9*re*), magnetic yoke (9*rf*), a magnetic trip lever (9*ra*) and a bimetallic strip (9*rc*) including an adjustment screw (9*rd*). Said unipolar switching module (9, 9', 9") in parallelepiped format comprises a case (9*ab*) comprising a first cavity (9*a*) and a second cavity (9*b*) inversely identical seen in FIG. 2, made of insulating material comprising an anterior side face (9*v*), anterior side face (9*o*), bottom face (9*s*), top face (9*t*) comprising a recess (9*u*) and a recess (9*x*), as well as an exit hole (9*ag*) passing to the passage of said magnetic trip lever (9*ra*) and of said bimetallic strip (9*rc*) of said thermomagnetic tripping set (9*r*).

Figure 8:
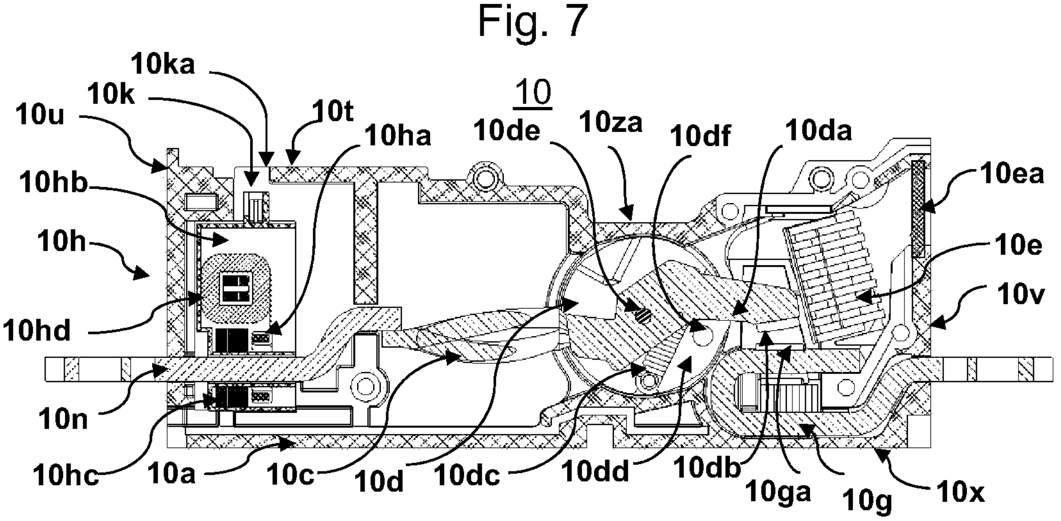
FIG. 8 illustrates, in a center cut view, the internal parts of unipolar switching module with a single rotary contact system of the electronic tripping molded case circuit breaker of FIG. 10, according to a third preferred embodiment of the present invention.

FIG. 8 illustrates, in a cross-section view, a unipolar switching module (10) of said multipolar molded case circuit breaker (1*c*) according to a third preferred embodiment of the present invention, in particular the representation of said central unipolar switching module (10), where the said modules (10, 10', 10") preferably being identical and sidewardly coupleable to each other, a first side electric connection terminal (10*n*), a strand (10*c*), a simple rotary contact system (10*d*), comprising a rotary traverse bar (10*da*) comprising a movable contact (10*db*) and spring (10*dc*) included in a pivoting support chamber (10*dd*) including a pivot shaft (lode) and a through hole (10*df*) to said equalization shaft (2*b*) of said rotary contact system (10*d*), said equalization shaft (2*b*) best seen in FIGS. 2 and 3, said rotary contact system (10*d*) being associated to an arc extinguishing system (10*e*), a grid (10*ea*) and to a fixed contact (10*ga*) electrically connected to a second electric connection terminal (10*g*), and magnetically coupled to said first side electric connection terminal (10*n*) is a current measurer and power supply set (10*h*) of said electronic controller (W) seen in FIG. 1, where said current measurer and power supply set (10*h*) comprising a current sensor (10*ha*), a current transformer set (10*hb*), comprising a magnetic core (10*hc*) and a power terminal (10*k*) of a power current coil (10*hd*), accessed by a through exit hole (10*ka*). Said unipolar switching module (10, 10', 10") in parallelepiped format comprises an insulating case (10*ab*) comprising a first cavity (10*a*) and a second cavity (10*b*) inversely identical to the cavity (10*a*), seen in FIG. 10, made of insulating material comprising an anterior side face (10*u*), posterior side face (10*v*), bottom face (10*x*), top face (10*t*) comprising a recess (10*za*).

Figure 9:
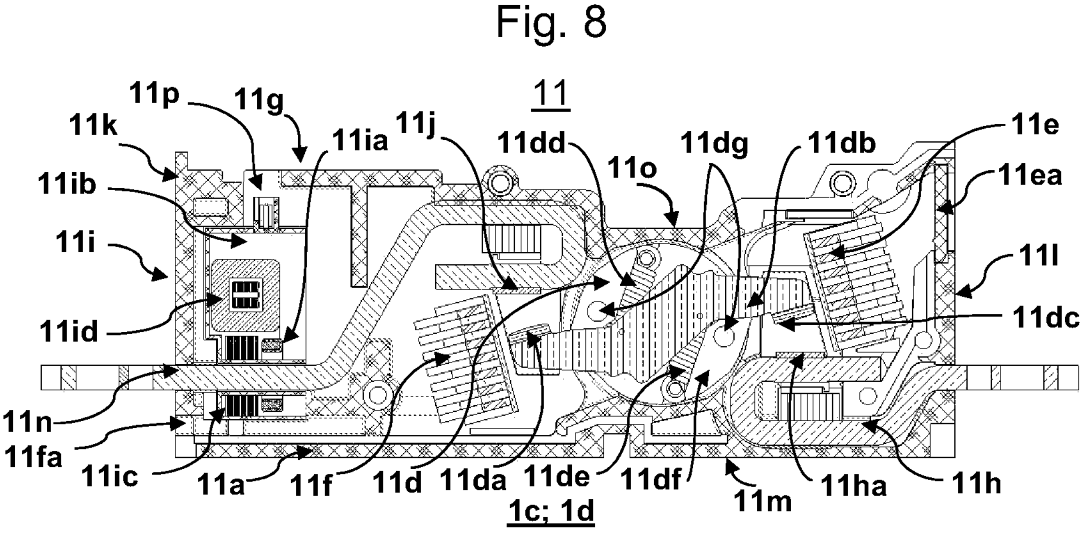
FIG. 9 illustrates, in a center cut view, the internal parts of unipolar switching module with a system of double rotary contact of the electronic tripping molded case circuit breaker of FIG. 10, according to a fourth preferred embodiment of the present invention.

FIG. 9 illustrates, in a cross-section view, a unipolar switching module (11) of said multipolar molded case circuit breaker (1*d*) according to a fourth preferred embodiment of the present invention, in particular the representation of said unipolar central switching module (11), said modules (11, 11', 11") preferably being identical and coupled sidewardly to each other, a first electric connection terminal (11*n*), comprising a first fixed contact (11*j*), a double rotary contact system (11*d*), comprised by a first movable contact (11*da*), a rotary traverse bar (11*db*), a second movable contact (11*dc*), springs (11*dd*, 11*de*), a pivoting support chamber (11*df*), through holes (11*dg*), said double rotary contact system (11*d*) associated to arc extinguishing systems (11*e*, 11*f*), grids (11*ea*, 11*fa*), a second fixed contact (11*ha*) of a second electric connection terminal (11*h*), and magnetically coupled to said first electric connection terminal (11*n*) is a current measurement and power supply set (11*i*) of said electronic controller (W), said measurer and power supply set (11*i*) comprising a current sensor (Ilia), a current transformer set (11*ib*), comprising a magnetic core (11*ic*), a power terminal (11*p*) and a power current coil (11*id*), accessed by a through exit hole (11*pa*). Said unipolar switching module (11, 11', 11") in parallelepiped format comprises an insulating case (11*ab*) comprising a first cavity (11*a*) and a second cavity (11*b*) inversely identical to the cavity (11*a*) seen in FIG. 10, made of insulating material comprising an anterior side face (11*k*), posterior side face (111), bottom face (11*m*), top face (11*g*) comprising a recess (11*o*).

Figure 10:
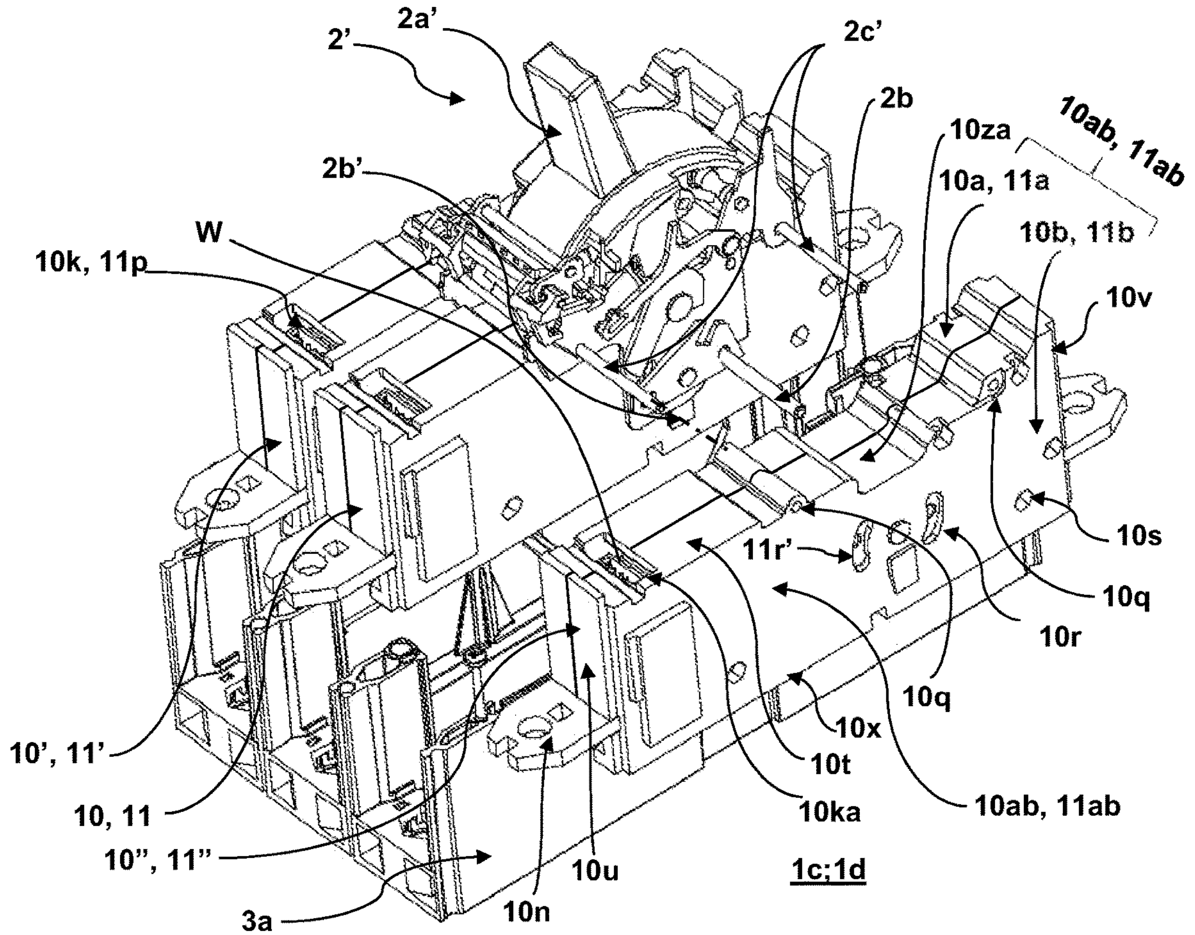
FIG. 10 illustrates, in an exploded schematic isometric perspective view, parts of the molded case circuit breaker of FIG. 1, according to a third and fourth preferred embodiments of the present invention.

FIG. 10 illustrates, in an exploded schematic isometric perspective view, parts of the molded case circuit breaker (1*c*, 1*d*) of FIG. 1, according to a third and fourth preferred embodiments of the invention, comprising an operating and tripping mechanism (2') comprising an operating handle (2*a'*) of said circuit breaker (1*c*, 1*d*), standard in the state of the art, said operating and tripping mechanism (2') comprising for said third preferred embodiment of the present invention of said electronic circuit breaker (1*c*) an equalization shaft (2*b'*) of the rotary contact system (10*d*) best viewed in FIG. 8, and two positioning shafts (2*c'*), fixed on a central unipolar switching module (10), jointly with a other two side unipolar switching modules (10', 10") preferably identical to said central unipolar switching module (10), comprising a case (10*ab*) and a base case (3*a*). Said unipolar switching modules (10, 10', 10") constructed in parallelepiped format comprise a case (10*ab*), comprising a first cavity (10*a*) and a second cavity (10*b*) preferably inversely identical made of insulating material, comprising an anterior side face (10*u*), posterior side face (10*v*), bottom face (10*x*), top face (10*t*) comprising a recess (10*za*), positioning side holes (10*q*), curved hole (10*r*), and fastening elements (10*s*) between said first insulating cavity (10*a*) and said second insulating cavity (10*b*). It is also possible to see internal components that stand out through of the first and second insulating cavities (10*a*, 10*b*), like the first side connection terminal (10*n*), and a power terminal (10*k*) of a power current coil (10*hd*) seen in FIG. 8 by way of a through exit hole (10*ka*), said power current coil (10*hd*) is connected to said solid state electronic controller (W) seen in FIG. 1. Practically identically to how the third preferred embodiment was presented, the fourth preferred embodiment of the present invention presents said electronic circuit breaker (1*d*), comprising an operating mechanism (2') comprising an operating handle (2*a'*) and additionally including a curved hole (11*r'*) and a second equalization shaft (2*b'*), of the double rotary contact system (11*d*) best observed in FIG. 9, and two positioning shafts (2*c'*), fixed on a unipolar central switching module (11), jointly with a other two side unipolar switching modules (11', 11") preferably identical to said unipolar central switching module (11) and a base case (3*a*). The external dimension of the modules (10, 10', 10", 11, 11', 11") is identical to all the modules (4, 4', 4", 9, 9', 9") as seen in FIGS. 2 and 10, for using identical fastening elements (4*k*, 10*s*), equalization shafts (2*b*, 2*b'*) and positioning shafts (2*c*, 2*c'*).

Figure 11:
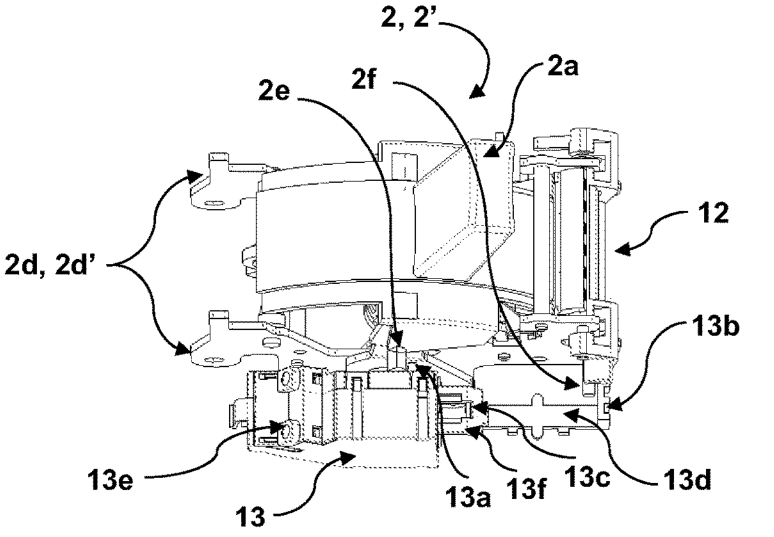
FIG. 11 is a top perspective view, showing in schematic detail the operating arrangement "OFF" of a tripping mechanism comprising a handle, a trip support lever, repositioning latch and its interaction with a side ledge and actuator of a trip coil, according to a third and fourth preferred embodiments of the present invention.

FIG. 11 presents in top perspective a tripping set (12) comprising, trip coil (13), schematically coupled to said operating and tripping mechanism (2, 2') seen in FIG. 10 of said circuit breaker (1*c*, 1*d*), comprising said handle (2*a*, 2*a'*), flanges (2*d*, 2*d'*), repositioning latch (2*e*), a shaft (2*f*), said trip coil (13), comprising a side ledge (13*a*), a lever (13*b*), a actuator latch (13*c*), and a trigger support (13*d*) connected to an actuator (13*f*), power terminals (13*e*) of a coil winding, in addition to an armature encasing a magnet with a case and a cylindrical core, comprising a compression spring, among other components (not represented), according to a third and fourth preferred embodiments of the present invention.

Figure 12:
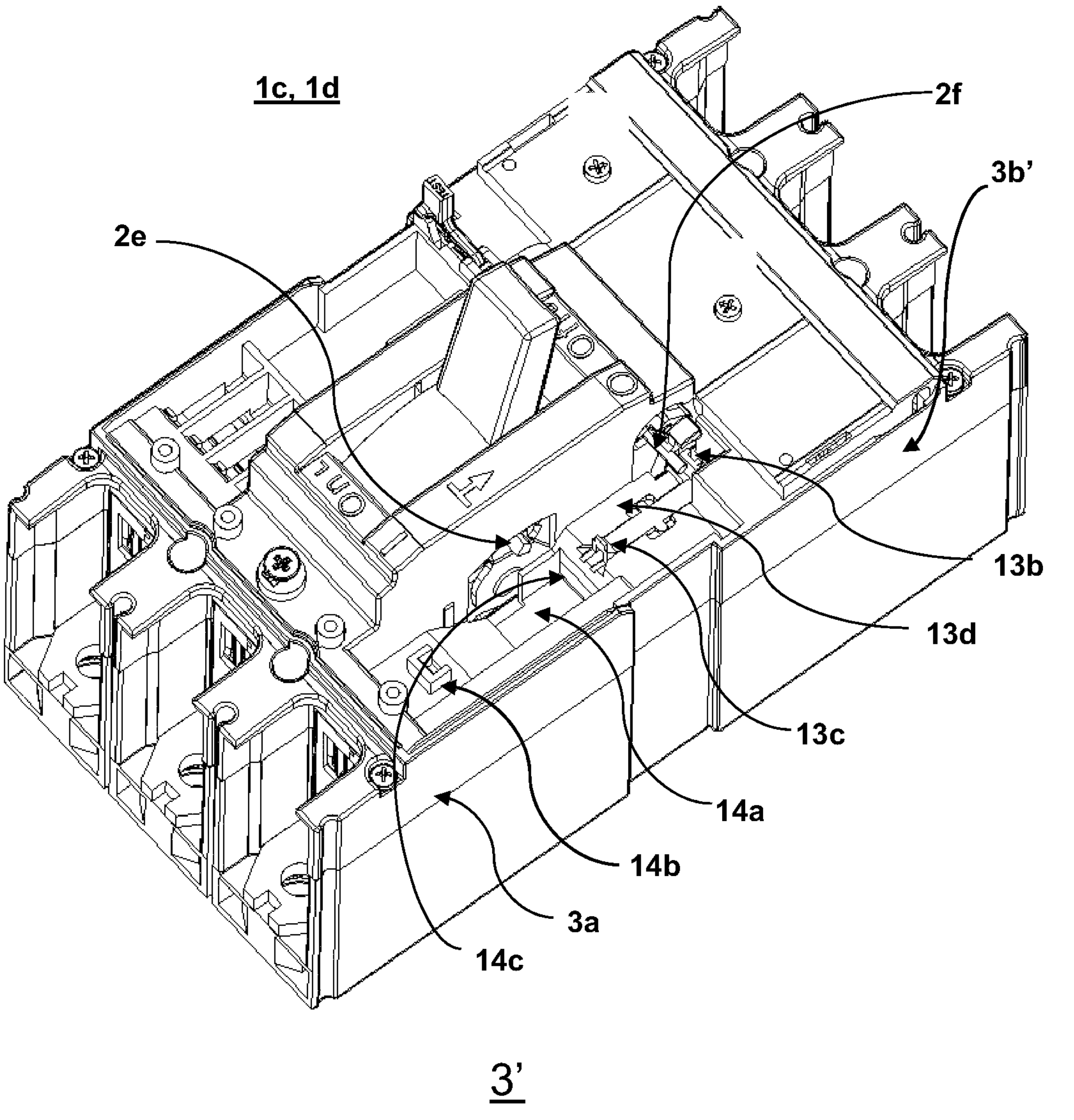
FIG. 12 is an isometric perspective view of said molded case circuit breaker of FIG. 1, presenting details of a seat for coupling said trip coil to said molded case circuit breaker, according to a third and fourth preferred embodiments of the present invention.

FIG. 12 shows in an isometric perspective view a circuit breaker (1*c*, 1*d*) without a top cover (3*c*') for presenting the detailing of a seat (14*a*) for said trip coil (13) seen in FIG. 11, which is fixed in the cooperation between snap fittings (14*b*, 14*c*) on the seat (14*a*) of said circuit breaker (1*c*, 1*d*). In this Figure, it is also possible to note said repositioning latch (2*e*), trigger support (13*d*), comprising said actuator latch (13*c*), a lever (13*b*) mounted on the external case (3') without said cover (3*c*') of said circuit breaker (1*c*, 1*d*), according to a third and fourth preferred embodiments of the present invention.

OPERATION OF THE INVENTION

In the state of the art, the search for advantageous arrangements are constant in both operation and manufacturing. Despite this, an assembly arrangement not obtained so far refers to assembly preparations, use of synergistic components both using thermomagnetic and electronic technology, already known, but that allow greater flexibility of assemblies and use of standardized components between them, without this burdening costs or leading to the use of dedicated components for each choice of arrangement. In this way the solution presented seeks to solve this in a way, wherein several configurations are permissible using the same philosophy and preparation, thus facilitating a range of pre-assemblies and administration of components in an organized way and that allows the use of various components throughout this range in a standardized and versatile way.

The molded case circuit breaker (1*a*, 1*b*) according to a first and second preferred embodiments of the present invention now detailed, meets a first objective of the invention, in the sense of providing unipolar circuit switching modules (4, 4', 4", 9, 9', 9") constructed to facilitate the assembly of components of a low-voltage molded case circuit breaker, provided with a different construction concept to others from the state of the art, its main fundament being the fact that the components of the unipolar switching module (4, 4', 4", 9, 9', 9") comprising at least one said thermomagnetic tripping set (4*r*, 9*r*), said rotary contact system (4*q*, 9*d*) best seen in FIGS. 4 and 7 and said arc extinguishing system (4*u*, 9*e*, 9*f*) are disposed in a prior set inside a first and a second cavity (4*a*, 4*b*), inversely identical which are conceived so as to pre-position the internal working components through of holes (4*h*, 4*j*, 4*i*, 4*aa*, 4*ac*, 4*ad*, 4*ae*, 4*ag*), guides (4*ah*) and other housing hollows of said unipolar switching module (4, 4', 4") using a simple rotary contact system (4*q*) seen in FIG. 4. Accommodating the internal components of said unipolar switching module (9, 9', 9") occurs in a similar manner by means of a prior set inside a first and a second cavity (9*a*, 9*b*) similarly to said first and second cavity (4*a*, 4*b*), for said unipolar circuit switching modules (9, 9', 9") where the pre-positioning of the internal components is through of holes (not represented) equivalent to said holes (4*h*, 4*j*, 4*i*, 4*aa*, 4*ac*, 4*ad*, 4*ae*, 4*ag*), guides (4*ah*) and other housing hollows similar to said unipolar switching module (4, 4', 4"), using the same concept for said double rotary contact system (9*d*).

A second objective achieved by the invention is to use a same case (4*ab*, 9*ab*) for unipolar thermomagnetic trip switching modules (4, 4', 4", 9, 9', 9"), wherein the second cavity (4*b*, 9*b*) is inversely identical to said first cavity (4*a*, 9*a*), which together form said insulating case of said unipolar thermomagnetic switching modules (4, 4', 4", 9, 9', 9") of said low-voltage circuit breaker (1*a*, 1*b*), and also use a same external case (3), comprising a base case (3*a*), intermediate case (3*b*) and cover (3*c*) which serves all unipolar circuit switching modules (4, 4', 4", 9, 9', 9"), due to their outer construction being identical to all the modules for using identical fastening elements (4*k*, 10*s*),), equalization shafts (2*b*, 2*b*') and positioning shafts (2*c*, 2*c*').

A third objective achieved by the invention is to use a same case (10*ab*, 11*ab*) for unipolar electronic trip switching modules (10, 10', 10", 11, 11', 11"), wherein the second cavity (10*b*, 11*b*) is inversely identical to said first cavity (10*a*, 11*a*) which together form said insulating case (10*ab*, 11*ab*) of said unipolar electronic circuit switching modules (10, 10', 10", 11, 11', 11") of said low-voltage circuit breaker (1*c*, 1*d*), and also use a same outer case (3') comprising base case (3*a*), intermediate case (3*b*') and cover (3*c*') which serves all unipolar switching modules (10, 10', 10", 11, 11', 11"), due to their external construction being identical to all the modules for using identical fastening elements (4*k*, 10*s*), equalization shafts (2*b*, 2*b*') and positioning shafts (2*c*, 2*c*'), and said base case (3*a*) is interchangeable between said unipolar thermomagnetic trip switching modules (4, 4', 4", 9, 9', 9").

A fourth objective of the invention is achieved by using a same external cavity (4*a*, 4*b*, 9*a*, 9*b*, 10*a*, 10*b*, 11*a*, 11*b*) for unipolar thermomagnetic/electronic trip switching modules (4, 4', 4", 9, 9', 9", 10, 10', 10", 11, 11', 11") which externally have identical dimensions, in a first, second, third and fourth preferred embodiment of the invention respectively, in different nominal current ranges, due to the modular concept proposed, where it is possible to make the prior assemblies, with a predetermined values of nominal current range, regardless of the range for the thermomagnetic tripping set (4*r*, 9*r*), facilitating the administration of inventories for subsequent final assembly, as said unipolar thermomagnetic trip switching modules (4, 4', 4", 9, 9', 9") and/or unipolar electronic circuit switching modules (10, 10', 10", 11, 11', 11") are stable, interchangeable, sidewardly fixed to each other, containing rotary contact systems (4*q*, 9*d*, 10*d*, 11*d*) in equalized form, through said equalization shaft (2*b*) and alternatively associated said second equalization shaft (2*b*'), where said operating and tripping mechanism (2, 2'), fixed on the upper part of said central unipolar switching module (4, 9, 10, 11), which comprises two positioning shafts (2*c*, 2*c*') are introduced into the side positioning holes (4*h*, 4*j*) of the first or second insulating cavities (4*a*, 4*b*, 9*a*, 9*b*, 10*a*, 10*b*, 11*a*, 11*b*) and between the unipolar side switching modules (4, 4', 4", 9, 9', 9", 10, 10', 10", 11, 11', 11"), allowing an equalization shaft (2*b*) and alternatively associated said second equalization shaft (2*b*') of the rotary contact system (4*q*, 9*d*, 10*d*, 11*d*) to command the action of any one of the rotary contact systems (4*q*, 9*d*, 10*d*, 11*d*) coupled sidewardly, comprised in said unipolar switching modules (4', 4", 9', 9", 10', 10", 11', 11") in an identical manner, when said operating and tripping mechanism (2, 2') is triggered, both by the operator in "ON/OFF" operations, and in any anomalous pre-configured situation arising from said thermomagnetic tripping bar (8*a*) pre-configured by the thermal adjustment button (8*d*), or from the magnetic trip lever (4*ra*, 9*ra*), in any anomalous pre-configured situation by means of a magnetic adjustment button (8*b*) jointly with a said thermomagnetic tripping bar (8*a*) of said tripping set (8) or also from the current measurer and power supply set (10*h*, 11*i*), which are electrically coupled by means of a power terminal (10*k*, 11*p*) to an electronic controller (W), incorporated inside the molded case circuit breaker (1*c*, 1*d*) and capable of promoting an electronic trip, triggering the opening of the rotary contact system (10*d*, 11*d*) thereof, through said operating and tripping mechanism (2) automatically.

A fifth objective of the present invention is achieved by providing a breaker switching device with a lesser number of components than the state of the art, when noting the options that use unipolar switching modules (4', 4", 9', 9", 10', 10", 11', 11"), as it does not require additional thermomagnetic or electronic trips in specific modules, when compared to that presented in the state of the art, which is situated outside the switching modules, which implies the use of additional fastening elements, such as hooks and complex docking support between each other.

A sixth objective of the invention is achieved by providing a switching device, such as a low-voltage molded case circuit breaker (1*a*, 1*b*, 1*c*, 1*d*), satisfying the above requirements, being compact in its longitudinal measure and simplified, maintaining the structural rigidity, due to the elimination of factors such as the use of fastening elements such as hooks and complex docking support, which by their connection nature, weaken the structure.

Besides the objectives proposed already achieved by the invention now proposed a tripping set (8) is provided, easily coupleable to the unipolar switching module (4, 4', 4", 9, 9', 9"), where it is positioned vertically through the said seat base (8*h*) and of said traverse seat (8*g*) on the top face (4*f*, 9*t*) and longitudinally through the vertical positioning rod (81) which encases in the recess (4*x*, 9*x*), in any one of the unipolar switching modules (4, 4', 4", 9, 9', 9"), being additionally positioned vertically through the vertical positioning rails (41) and the guide rails (8*f*). Side locking shafts (8*j*) are additionally provided in said tripping set (8), which behave as stand-bys and which at the time wherein the unipolar switching modules (4, 4', 4", 9, 9', 9") are positioned side by side, former are positioned in the positioning holes (4*g*) of the first or second insulating cavities (4*a*, 4*b*, 9*a*, 9*b*), whereby promoting for this positioner set a fast locking of said tripping set (8) in the 3 possible displacement shafts.

Lastly, the unipolar thermomagnetic switching modules (4, 4', 4", 9, 9', 9") or the electronic unipolar switching modules (10, 10', 10", 11, 11', 11") chosen according to a set pre-arrangement, coupled to the operating and tripping mechanism (2, 2') and a tripping set (8) or alternatively an electronic controller (W) are introduced into the outer case (3, 3'), specifically at the base case (3*a*), so as jointly with the intermediate case (3*b*, 3*b*') and said cover (3*c*, 3*c*'), to form said low-voltage molded case circuit breaker (1*a*, 1*b*, 1*c*, 1*d*), constituting a double insulating case.

Said operating and tripping mechanism (2, 2') comprises an operating handle (2*a*, 2*a*'), whose rotational articulation transmits to the equalization shaft (2*b*) or alternatively a second equalization shaft (2*b*') to said rotary contact systems (4*q*, 9*d*, 10*d*, 11*d*) the force necessary to open and close to command the action of any one of said rotary contact systems (4*q*, 9*d*, 10*d*, 11*d*) of said circuit breaker (1*a*, 1*b*, 1*c*, 1*d*), by means of handles, locking elements and springs (not represented) known in the state of the art. Additionally, when a failure occurs, notably an overcurrent or a short-circuit, the contacts are provided to open automatically, due to the action of a trip device as preferably the thermomagnetic tripping set (4*r*), acting jointly with the operating and tripping mechanism (2, 2').

Alternatively and according to a third and fourth embodiments of the invention, from said current measurer and power supply set (10*h*, 11*i*) associated with a said solid state electronic controller (W), it is possible to control said trip coil (13) coupled to said operating and tripping mechanism (2, 2') comprising a shaft (2*f*) associated to said lever (13*b*) capable of transmitting a displacement movement of the trigger support (13*d*) comprising actuator latch (13*c*) from the actuator (13*f*), wherein said trip coil (13), its said coil winding of the power terminals (13*e*) being electrically powered from said solid state electronic controller (W), wherein said trip coil (13) comprising an armature, encase a magnet with a casing and a cylindrical core, comprising compression spring, among other components (not represented), which assist the movement of said actuator (13*c*), in the ratio of external components of said trip coil (13), where said core (not represented) when energized from a signal of said solid state electronic controller (W), move said actuator (13*f*), associated to said trigger support (13*d*) and lever (13*b*) to provoke a displacement of the internal trigger and trip mechanism (2, 2') and disarm said circuit breaker (1*c*, 1*d*), to an intermediary position between the closed position "ON" and the open position "OFF", for a "TRIP" state of said circuit breaker (1*c*, 1*d*), breaking an associated electrical circuit.

After said "TRIP", the prior "OFF" (re-arm) movement to a restart wherein said associated circuit breaker (1*c*, 1*d*) associated can be "ON", or "OFF" (re-armed), after said associated circuit breaker (1*c*, 1*d*) associated is tripped, is carried out wherein said side ledge (13*a*) of said trip coil (13) is associated with a said repositioning latch (2*e*) of said handle (2*a*, 2*a*'), when said handle (2*a*, 2*a*') of said operating and tripping mechanism (2, 2') returns to the initial position after a trip and repositions said trip coil (13) for a new trigger, conducting said lever (13*b*), trigger support (13*d*) and actuator (13*f*) to an initial position capable of a new trip of said trip coil (13).

The circuit breakers (1*a*, 1*b*, 1*c*, 1*d*), including the reception of auxiliary trip devices which can be disarm devices like auxiliary trip coils of the subtension type or auxiliary remote trip coils have already been achieved or proposed.

Another proposal included designing unipolar thermomagnetic switching modules (4, 4', 4", 9, 9', 9") or unipolar electronic trip switching modules (10, 10', 10", 11, 11', 11"). A unipolar switching module (4, 4', 4", 9, 9', 9", 10', 10", 11, 11', 11") of this kind generally comprises a certain number of parts which are common to both kinds of unipolar switching modules. Other parts of the unipolar switching module are, however, specific for the unipolar switching module (4, 4', 4", 9, 9', 9") and other different parts are specific for electronic trip unipolar switching module (10, 10', 10", 11, 11', 11"). Additionally, certain parts are common to both kinds of modules, such as for example preferably the rotary contact system (4*q*, 9*d*, 10*d*, 11*d*) or said arc-extinguishing system (4*u*, 9*e*, 9*f*, 10*e*, 11*e*, 11*f*) and their grids (4*ua*, 9*ea*, 9*fa*, 10*ea*, 11*ea*, 11*fa*), and also a base case (3*a*), among others.

The fact that a large number of parts are different in these two types of devices is a disadvantage as this leads to a relatively high manufacturing cost and with a set cost that is also relatively high.

Another object achieved of the present invention is to propose a circuit breaker (1*a*, 1*b*, 1*c*, 1*d*), being able to constitute a switching device containing unipolar thermomagnetic switching modules (4, 4', 4", 9, 9', 9") or containing unipolar electronic trip switching modules (10, 10', 10", 11, 11', 11") to which almost all the parts that constitute said circuit breaker (1*a*, 1*b*, 1*c*, 1*d*) are identical for both, which may be constructed.

It should obviously be understood that other modifications and variations made to this invention are considered to be within the scope of the present invention.

The invention claimed is:

1. A unipolar switching module comprising:

a case made of insulating material;

a contact system associated with electrical connection terminals and an arc extinguishing system; and a set;

wherein the contact system is selected from the group consisting of a rotary contact system and a double rotary contact system;

wherein the set is selected from the group consisting of a thermomagnetic tripping set associated with one of the electrical connection terminals and a current measurer and power supply set associated with one of the electrical connection terminals; and wherein the rotary contact system comprises:

a rotary traverse bar;

a movable contact;

a spring;

an equalization shaft; and a pivoting support chamber, within which the rotary traverse bar, the movable contact, the spring and the equalization shaft are at least partially contained, the pivoting support chamber including:

a pivot shaft; and a through hole for the equalization shaft.

2. A unipolar switching module comprising:

a case made of insulating material;

a contact system associated with electrical connection terminals and an arc extinguishing system; and a set;

wherein the contact system is selected from the group consisting of a rotary contact system and a double rotary contact system;

wherein the set is selected from the group consisting of a thermomagnetic tripping set associated with one of the electrical connection terminals and a current measurer and power supply set associated with one of the electrical connection terminals; and wherein the double rotary contact system comprises:

a first movable contact;

a rotary traverse bar;

a second movable contact;

springs;

a first equalization shaft;

a second equalization shaft; and a pivoting support chamber, within which the first movable contact, the rotary traverse bar, the second movable contact, the springs, the first equalization shaft and the second equalization shaft are at least partially contained;

wherein the pivoting support chamber has through holes for the first equalization shaft and the second equalization shaft.

3. A unipolar switching module comprising:

a case made of insulating material;

a contact system associated with electrical connection terminals and an arc extinguishing system; and a set;

wherein the contact system is selected from the group consisting of a rotary contact system and a double rotary contact system;

wherein the set is selected from the group consisting of a thermomagnetic tripping set associated with one of the electrical connection terminals and a current measurer and power supply set associated with one of the electrical connection terminals;

wherein the thermomagnetic tripping set comprises:

a shunt bar;

a magnetic yoke;

a bimetallic strip; and a magnetic trip lever; and wherein the thermomagnetic tripping set is electrically connected to the associated electric connection terminal through a fastening element;

wherein the case comprises a first cavity and a second cavity made of insulating material, each cavity defined by an inner face and outer faces, the outer faces comprising an anterior side face, a posterior side face, a bottom face and a top face that comprises a recess; and wherein the magnetic trip lever is transversely bearing on one side to a guide of the inner face of the first cavity and on the other side to an equivalent but inverted guide of the inner face of the second cavity.

4. A unipolar switching module comprising:

a case made of insulating material;

a contact system associated with electrical connection terminals and an arc extinguishing system; and a set;

wherein the contact system is selected from the group consisting of:

a rotary contact system comprising a rotary traverse bar, a movable contact, a spring, an equalization shaft, and a pivoting support chamber, wherein within the pivoting support chamber the rotary traverse bar, the movable contact, the spring and the equalization shaft are at least partially contained, wherein the pivoting support chamber includes a pivot shaft and a through hole for the equalization shaft; and a double rotary contact system comprising a first movable contact, a rotary traverse bar, a second movable contact, springs, a first equalization shaft, a second equalization shaft, and a pivoting support chamber, wherein within the pivoting support chamber the first movable contact, the rotary traverse bar, the second movable contact, the springs, the first equalization shaft and the second equalization shaft are at least partially contained, and wherein the pivoting support chamber has through holes for the first equalization shaft and the second equalization shaft; and wherein the set is selected from the group consisting of a thermomagnetic tripping set associated with one of the electrical connection terminals and a current measurer and power supply set associated with one of the electrical connection terminals.

5. A unipolar switching module comprising:

a case made of insulating material;

a contact system associated with electrical connection terminals and an arc extinguishing system; and a set selected from the group consisting of a thermomagnetic tripping set associated with one of the electrical connection terminals and a current measurer and power supply set associated with one of the electrical connection terminals;

wherein the thermomagnetic tripping set comprises:

a shunt bar;

a magnetic yoke;

a bimetallic strip; and a magnetic trip lever;

wherein the thermomagnetic tripping set is electrically connected to the associated electric connection terminal through a fastening element;

wherein the electrical connection terminals comprise fixed contacts;

wherein the current measurer and power supply set are electrically coupled to an electronic controller;

wherein the case comprises a first cavity and a second cavity made of insulating material, each cavity defined by an inner face and outer faces, the outer faces comprising an anterior side face, a posterior side face, a bottom face and a top face that comprises a recess; and wherein the magnetic trip lever is transversely bearing on one side to a guide of the inner face of the first cavity and on the other side to an equivalent but inverted guide of the inner face of the second cavity.

6. A unipolar switching module comprising:

a case made of insulating material;

a contact system associated with electrical connection terminals and an arc extinguishing system; and a set;

wherein the contact system is selected from the group consisting of a rotary contact system and a double rotary contact system;

wherein the set is selected from the group consisting of a thermomagnetic tripping set associated with one of the electrical connection terminals and a current measurer and power supply set associated with one of the electrical connection terminals; and wherein the electrical connection terminals are magnetically coupled to the current measurer and power supply set and electrically connected to the contact system through a strand.

7. The unipolar switching module according to claim 1 or 2, wherein the electrical connection terminals comprise fixed contacts; and wherein the current measurer and power supply set is electrically coupled to an electronic controller.

8. The unipolar switching module according to claim 1 or 2, wherein the case comprises a first cavity and a second cavity made of insulating material, each comprising an anterior side face, a posterior side face, a bottom face and a top face that comprises a recess.

9. The unipolar switching module according to claim 1 or 2, wherein the arc extinguishing system comprises grids.

10. A circuit breaker comprising:

an operating and tripping mechanism;

a tripping set; and the unipolar switching module according to claim 1 or 2;

wherein when the unipolar switching module comprises the thermomagnetic tripping set, the thermomagnetic tripping set of the unipolar switching module interacts with the tripping set of the thermomagnetic circuit breaker with the operating and tripping mechanism; and wherein when the unipolar switching module comprises the current measurer and power supply set, the current measurer and power supply set of the unipolar switching module for the electronic controller is associated with a trip coil that interacts with the operating and tripping mechanism.

11. The circuit breaker according to claim 10 further comprising unipolar side circuit breaker modules mounted side by side relative to the unipolar switching module.

12. The circuit breaker according to claim 10 further comprising an external case for housing the operating and tripping mechanism, the tripping set, and the unipolar switching module.

13. The circuit breaker according to claim 12, wherein the external case comprises:

an insulating base case;

an insulating intermediate case; and an insulating cover.

14. The circuit breaker according to claim 10, wherein the trip coil comprises an actuator associated to a lever coupled to the operating and tripping mechanism that can release the operating and tripping mechanism to a "TRIP" state.

15. The unipolar switching module according to claim 1, 2 or 4, wherein the thermomagnetic tripping set is electrically connected to the associated rotary contact system through a strand.

16. The unipolar switching module according to claim 1, 2 or 4, wherein the thermomagnetic tripping set is electrically connected to a termination extension comprising a first fixed contact of the fixed contacts associated with the double rotary contact system.

17. The unipolar switching module according to claim 1, 2 or 4, wherein the electrical connection terminals are magnetically coupled to the current measurer and power supply set and electrically connected to the associated contact system through a strand.

18. The unipolar switching module according to claim 1, 2 or 4, wherein the electrical connection terminal comprises a first fixed contact of the fixed contacts associated with the double rotary contact system and is magnetically coupled to the current measurer and power supply set.

* * * * *